United States Patent
Jenny et al.

(10) Patent No.: US 10,129,470 B2
(45) Date of Patent: Nov. 13, 2018

(54) APPARATUS AND METHOD FOR GENERATING AN OUTPUT VIDEO STREAM FROM A WIDE FIELD VIDEO STREAM

(71) Applicant: GOPRO, INC., San Mateo, CA (US)

(72) Inventors: Alexandre Jenny, Challes-les-Eaux (FR); Yann Renaud Gilquin, Chambery (FR)

(73) Assignee: GoPro, Inc., San Mateo, CA (US)

( * ) Notice: Subject to any disclaimer, the term of this patent is extended or adjusted under 35 U.S.C. 154(b) by 414 days.

(21) Appl. No.: 14/887,122

(22) Filed: Oct. 19, 2015

(65) Prior Publication Data

US 2016/0112635 A1    Apr. 21, 2016
US 2018/0255241 A9    Sep. 6, 2018

Related U.S. Application Data

(63) Continuation of application No. PCT/EP2014/058008, filed on Apr. 18, 2014.

(30) Foreign Application Priority Data

Apr. 19, 2013    (FR) .................................. 13 53565

(51) Int. Cl.
*H04N 5/232* (2006.01)
*G06T 3/00* (2006.01)
*H04N 9/31* (2006.01)

(52) U.S. Cl.
CPC ....... *H04N 5/23238* (2013.01); *G06T 3/0031* (2013.01); *H04N 9/3179* (2013.01)

(58) Field of Classification Search
CPC ........... H04N 5/23238; H04N 13/0242; H04N 5/2628; H04N 19/597; H04N 13/044;
(Continued)

(56) References Cited

U.S. PATENT DOCUMENTS 5,260,779 A    11/1993    Wasserman
5,555,895 A    9/1996    Ulmer
(Continued)

FOREIGN PATENT DOCUMENTS

EP    0605045 A1    7/1994
EP    0650299 A1    4/1995
EP    0661672 A1    7/1995

OTHER PUBLICATIONS

Foote J et al: 'FlyCam: Practical Panoramic Video and Automatic Camera Control', Multimedia and Expo, 2000. ICME 2000. 2000 IEEE International Conference on New York, NY, USA Jul. 30-Aug. 2, 2000, Piscataway, NJ, USA,IEEE, US, vol. 3, 30 juillet 2000 (Jul. 30, 2000), pp. 1419-1422, XP010512772, DOI: 10.1109/ICME. 2000.871033 ISBN: 978-0-7803-6536-0.
(Continued)

*Primary Examiner* — Anand S Rao
*Assistant Examiner* — Samuel D Fereja
(74) *Attorney, Agent, or Firm* — Sheppard Mullin Richter & Hampton LLP

(57) ABSTRACT

System and methods are disclosed for generating an output video stream from a wide field video stream. The wide field video stream may be created from compiling a plurality of video stream capturing different viewpoints of the same environment simultaneously. Upon selecting a wide field video stream, a first geometric function may be utilized to generate individual intermediate points that correspond to locations in a wide field video stream to be displayed on a particular display space. A second geometric function may be further utilized to generate reference points so that a the pixel on the output video stream are determined from the intermediate points of the wide field video stream of the first geometric function. Upon the execution of the first and
(Continued)

second geometric function, an output video stream is generated for display on the determined display space.

15 Claims, 6 Drawing Sheets

(58) Field of Classification Search
CPC .............. H04N 13/0059; H04N 13/04; H04N 13/0484; H04N 2013/0081; H04N 5/23206; H04N 5/272; H04N 7/15; H04N 13/0014; H04N 13/0029; H04N 13/0239; H04N 1/6058; H04N 21/21805; H04N 5/247; H04N 5/2624; H04N 7/144; H04N 7/181; H04N 9/67; H04N 13/0022; H04N 13/0264; H04N 13/0468; H04N 19/132; H04N 19/17; H04N 19/59; H04N 19/61; H04N 2013/0092; H04N 21/24; H04N 21/42203; H04N 21/4223
See application file for complete search history.

(56) References Cited

U.S. PATENT DOCUMENTS

| | | |
|---|---|---|
| 7,057,663 B1 | 6/2006 | Lee |
| 2003/0098954 A1 | 5/2003 | Amir |
| 2006/0023105 A1* | 2/2006 | Kostrzewski ......... G06T 3/0018 348/335 |
| 2007/0053659 A1 | 3/2007 | Kiyama |
| 2007/0124783 A1* | 5/2007 | Ahiska ............... H04N 5/23206 725/105 |
| 2007/0300249 A1 | 12/2007 | Smith |
| 2009/0210707 A1 | 8/2009 | De Lutiis |
| 2009/0271447 A1 | 10/2009 | Shin |
| 2013/0021450 A1 | 1/2013 | Yoshizawa |
| 2013/0127984 A1* | 5/2013 | Grecu ................ H04N 5/23238 348/36 |
| 2015/0142742 A1 | 5/2015 | Hong |
| 2015/0288754 A1 | 10/2015 | Mosko |
| 2016/0098469 A1 | 4/2016 | Allinson |
| 2016/0165563 A1 | 6/2016 | Jang |

OTHER PUBLICATIONS

Hossein Afshari et al: "The PANOPTIC Camera: A Plenoptic Sensor with Real-Time Omnidirectional Capability", Journal of Signal Processing Systems, vol. 70, No. 3, 14 mars 2012 (Mar. 14, 2012), pp. 305-328, XP055092066, ISSN: 1939-8018, DOI: 10.1007/s11265-012-0668-4.

Benjamin Meyer et al: "Real-time Free-Viewpoint Navigation from Compressed Multi-Video Recordings", Proc. 3D Data Processing, Visualization and Transmission (3DPVT), 31 mai 2010 (May, 31, 2010), pp. 1-6, XP055091261, Extrait de l'Internet: URL:http://www.cg.cs.tu-bs.de/media/publications/meyer2010realtime.pdf [extrait le Dec. 3, 2013].

PCT International Search Report for PCT/EP2014/058008 dated May 26, 2014.

\* cited by examiner

APPARATUS AND METHOD FOR GENERATING AN OUTPUT VIDEO STREAM FROM A WIDE FIELD VIDEO STREAM

FIELD OF THE INVENTION

An apparatus and methods described herein generally relate to generating an output video stream from a wide field video stream.

BACKGROUND OF THE INVENTION

Videos cameras can be assembled in numerous directions with multiple angles and viewpoints so as to simultaneously film a particular environment. When assembling the various complementary films, the assembly may results in a wide field video stream with a field of view exceeding the normal human eye.

While the wide field video stream provides the advantage of streaming or creating a video of a particular environment with a 180-degree to 360-degree viewpoint, a portion of the wide field video stream may be selected for viewing or editing purposes. However, extracting and displaying a portion of the wide field video stream onto a display screen may result in lag time and significantly lower video stream pixel resolution resulting in poor visual display.

SUMMARY

The disclosure herein relates to a generated output video stream from a selected wide field video stream. The generated output video stream is displayed on a two-dimensional display space so that an image of the output video stream correlates to the corresponding image of the wide field video stream. The objective the output video stream may include utilizing a first geometric function to determine a particular portion of the wide field video stream to be displayed onto a particular display space. The application of the first geometric function may considerably limit the calculation time of the output video stream so that the stream is achieved in real time without loss of quality.

A method and system configured to generate an output video stream from a selected wide field video stream may include one or more physical processors configured by a machine readable instruction to select a wide field video stream. The wide field video stream may correspond to an assembly of multiple video streams with various different field of views of the same environment.

The wide field video stream may be selected with a portion of the video stream to be viewed according to a particular projection. The projection may include a modified view of a wide field video stream by distorting the angle view and orientation of the wide field video stream to create a new immersive experience. The determined projection of the wide field video stream may then be transmitted onto a display space. The display space may include at least one screen. In other embodiments, the display space may include a plurality of display screens that correspond to different field of view and projections of the wide field video stream.

The physical processors may be configured to generate intermediate points by executing a first geometric function. In particular, the input parameters of the first geometric function include the specified projection and a specific field of view from a camera lens of the wide field video stream. The generated individual intermediate points may correspond to locations on the wide video stream such that the intermediate points contain the location of each point on the image of the wide field video stream. In further embodiments, the intermediate points may correspond to at least one pixel of the wide field video stream to be displayed on the selected display space.

The physical processors may also be configured to generate reference points by executing a second geometric function. In particular, the second geometric function takes as input parameters the intermediate points from the first geometric function. The generated reference points may correspond to at least one pixel of the wide field video stream with at least one pixel of the output video stream.

The generated output video may include visual effects. Some visual effects may include a contrast filter, luminosity filter, saturation filter, color filter, and an image deformation filter to further enhance the visual experience. In other embodiments, the output video stream may be displayed on a device with a touchscreen, accelerometer, gyroscope, magnetometer, pointing device, and a moving detecting gestural interface.

The physical processors may be configured to modify the field of view and orientation of a virtual video camera. In one embodiment, the field of view may be modified by updating the coordinates of the intermediate points. The field of view may be further modified by converting the coordinates of the intermediate point in a three dimensional coordinate system into coordinates in a spherical coordinate system. Other modifications may include modifying the orientation of the virtual camera and normalizing the coordinates in the spherical coordinate system to create new coordinates in a three dimensional coordinate system.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

Figure 1:
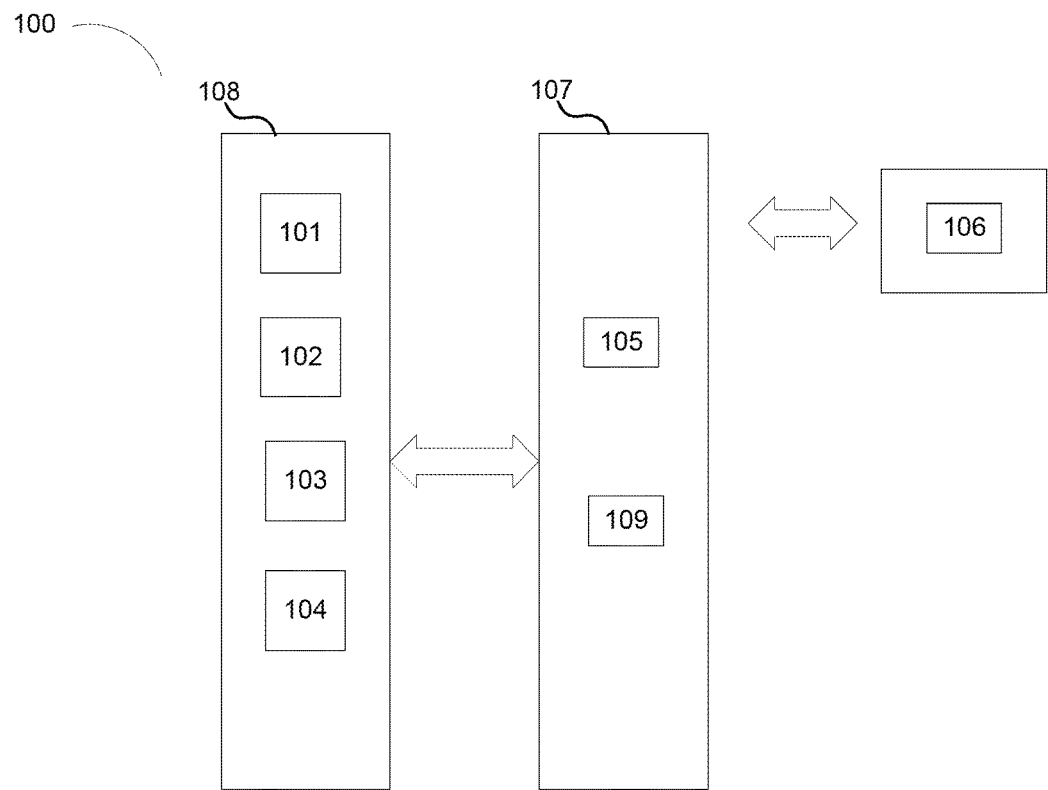
FIG. 1 illustrates a system configured for generating an output video stream from a selected wide field video stream, in accordance with one or more implementations.

FIG. 1 illustrates an example system 100 that is configured for generating an output video stream from a selected wide field video stream. In some implementations, as illustrated in FIG. 1, the system may include a central processing unit 107 so that specified instructions can be executed by a main processor, or the control processing unit 107. Specified instructions executed by the control processing unit 107 may include selecting a wide field video stream 101. The wide field video stream 101 may correspond to a plurality of video streams pertaining to different field of views of one particular environment. In other instances, the plurality of video streams may be further obtained by utilizing a plurality of video cameras oriented in different directions so as to generate a plurality of complementary films combined. As such, the plurality of video streams may capture a field of view exceeding the human field of view resulting in a 180 to 360 degree viewpoint of the filmed environment.

The wide field video stream 101 may exhibit a resolution in terms of pixels such that the resolution is greater than the resolution of the output video stream. The wide field video stream 101 may constitute a video file filmed from a single lens system. The wide field video stream 101 may also be a high definition video file.

Other specified instructions executed by the control processing unit 107 may include selecting a display space 102. A display space 102 may correspond to a display area of a two-dimensional screen. The display space 102 may include display points to display content from the wide field video stream 101. In other embodiments, the display points may be associated with a pixel on the screen of the display space 102. Each point on the display space 102 may correspond to a pixel of the image of the output video stream.

Figure 2A:
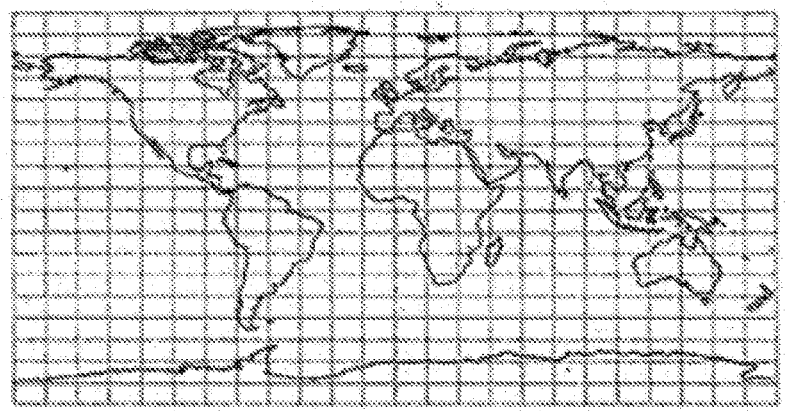
FIG. 2A illustrates a representation of a desire projection, in accordance with one or more implementations.
Figure 2B:
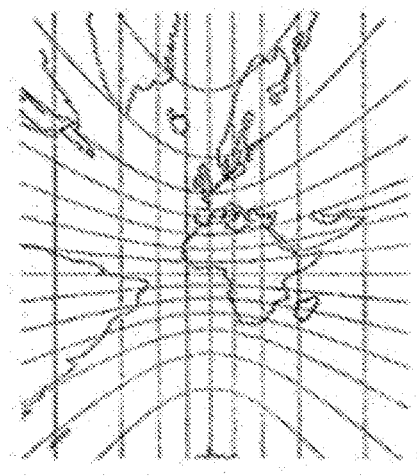
FIG. 2B illustrates an a representation of a desired projection, in accordance with one or more implementations.

Other specified instructions that may be executed by the control processing unit 107 may further include selecting a desired projection 103. The projection 103 may include selecting a portion of the wide field video stream 101 to be displayed in the determined display space 102. More specifically, a projection 103 of the wide field video stream 101 includes modifying the current representation of the wide field video stream 101. As illustrated in FIG. 2A, the wide field video stream is selected to depict a rectilinear projection. In FIG. 2B, the wide field video stream is further selected to depict a stereographic projection. Other projections that may be applied onto the wide field video stream may include a flat projection, mirror ball projection, or map projection by way of example only. Other various types of projections may be applied as would be appreciated by one of ordinary skill in the art. Such projections may create an immersive experience for the viewer.

Determining the desired field of view 104 from the wide field video stream 101 allows a portion of the wide field video stream with the applied projection 103 to be viewed on a display space 102. Selecting the desired field of view 104 can be defined by selecting a particular field of view angle of a virtual camera viewing the wide field view stream 101 in accordance to a particular projection 103. In other embodiments, the desired field of view 104 may further be determined by selecting a particular orientation of the virtual camera viewing the desired wide field view stream 101 in accordance to the selected projection 103.

The graphic processor unit 107 may be incorporated into system 100 to generate an output video stream 106 by performing display related calculation functions, such as a first geometric function 109 and second geometric function 105. The calculated functions 109, 105 may convert the pixel of the output video stream and the pixel of the wide field video stream respectively so that the appropriate video content is displayed on the determined display space 102.

Figure 3:
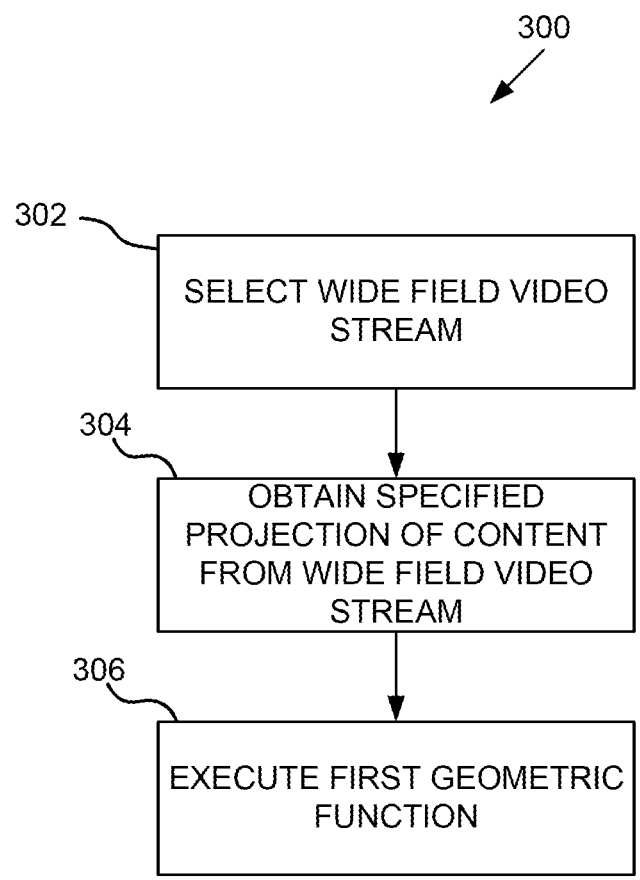
FIG. 3 illustrates a method configured for generating an output video stream with a first geometric function, in accordance with one or more implementations.

FIG. 3 illustrates an exemplary method for presenting an output video stream 106 utilizing a first geometric function calculation. The operations of method 300 and other methods included are intended to be illustrative and non-limiting examples. In certain implementations, method 300 may be accomplished with one or more additional operations not described, and/or without one or more of the operations discussed. Additionally, the order in which the operations of method 300 are illustrated in FIG. 3 and described below is not intended to be limiting.

In certain implementations, method 300 may be implemented in one or more processing devices (e.g., a digital processor, an analog processor, a digital circuit designed to process information, an analog circuit designed to process information, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

Regarding method 300, at operation 302, a wide field video stream may be selected that corresponds to an assembly of a plurality of video streams or cameras oriented in different directions to generate a wide view point of a particular environment.

At operation 304, a specified projection of content from the wide field video stream may be obtained and displayed on a determined display space. The display space may include multiple display points to display content from the wide field video stream.

At operation 306, a first geometric function may be executed in order to determine each point of the display space so that an output video stream may be viewed on the display space. The first geometric function includes input parameters that include the desired projection and desired field of view of the wide field video stream. Executing the first geometric function according to the parameters results in the first geometric function to output intermediate points.

Intermediate points correspond to the location point of the content of the wide field video stream to be displayed on the a particular display space. As such, each intermediate point corresponds to the content to be displayed on the display point of the displace space. In further embodiments, each intermediate point may correspond to each pixel of content of the wide field video stream displayed on the display space.

As such, the execution of the first geometric function provides a streamlined calculation for displaying the selected projection of the wide video stream onto the display space. The wide field video stream may be decomposed into a plurality of images where each image represents a distinct image within the wide field video stream. Each of the images may be used in combination with the intermediate points to form a plurality of corresponding images of the output video stream.

Figure 4:
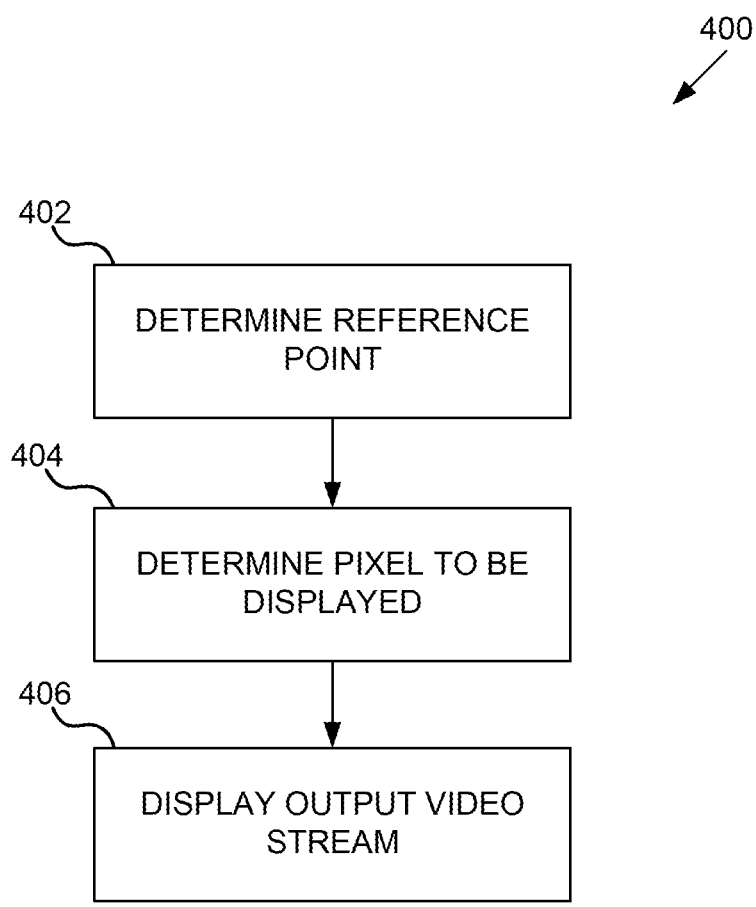
FIG. 4 illustrates a method configured for generating an output video stream with a second geometric function, in accordance with one or more implementations.

FIG. 4 illustrates an exemplary method 4 for generating an output video stream. In certain implementations, method 400 may be implemented in one or more processing devices (e.g., a digital processor, an analog processor, a digital circuit designed to process information, an analog circuit designed to process information, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

Regarding method 400, at an operation 402, the output video stream may be generated by determining a reference point through the calculation of a second geometric function. In determining the reference point, the second geometric function may include parameters of the corresponding intermediate points generated from the first geometric function. In other words, the execution of the second geometric function converts the coordinates of the intermediate points that are a function of the desired projection of the wide video stream. The converting of the coordinates of the intermediate points allows pixels of the image of the output video stream to correspond to pixels of the image of the wide field video stream.

At operation 404 of method 400, the determination of the reference point corresponds to a pixel of an image of the wide field video stream to be displayed on a display space. In some instances, the reference point may not correspond exactly to a particular pixel of the image from the wide field video stream. Instead, the reference point may correspond to a zone of the wide field video stream. A zone may constitute more than two pixels that correspond to areas closest to the reference point. In the instance that the reference point corresponds to a zone within the wide field video stream, a new pixel may be generated by extracting and weighing a plurality of pixel from the image of the wide field video stream. The new pixel will be dependent on the extraction of pixels originating from the corresponding wide field video stream.

At operation 406 of method 400, the output video stream may be generated from the established reference points from the second geometric function from operation 404 of method 400 and displayed on a display space. The display space may include at least one screen to display the generated output video stream. In other instances, the display space may include a display screen where each screen includes a plurality of display spaces each displaying an output video stream. The output video stream may be formed from the same wide field video stream according to various field of views or different projections.

In other embodiments, the display screen may include two separate display spaces that are each respectively intended to be viewed by left eye and a right eye of the observer respectively. Alternatively, such a display method may allow the displaying a first output stream in a display space of a first screen and displaying a second output stream in a display space of a second screen. In further embodiments, the display screens may be viewed by an observer with an immersive headset, which may be known as an "headset VR" to one of ordinary skill in the art. The immersive headset may be further configured to be worn by the observer. In other embodiments, a multimedia portable device with a display screen may me mounted onto the immersive headset to create a more dynamic and immersive experience for the user. Examples of a multimedia portable device may include a multimedia tablet or telephone with a camera device.

Further regarding operation 406 of method 400, displaying the output video stream on a selected display space may include modifying the field of view or projection during the course of broadcasting the output video stream. In the particular instance that the projection is modified, a new first geometric function is generated by specifying a new projection for the output video stream. The new projection will result in a new image of the output video stream according to the new first geometric function.

In other embodiments, operation 406 of method 400 may further include modifying the desired field of view during the course of broadcasting the output video stream. Modifying the desired field of view may include updating the coordinates of the intermediate points by modifying the orientation of the virtual camera. The orientation of the virtual camera may be located in a spherical coordinate system where further modification of the field of view angle may include modifying the latitude angle and longitude angle of the virtual camera in the spherical coordinate system. The coordinates of the intermediate points may be normalized in the three dimensional coordinate system to determine and apply the new coordinates of the intermediate points to the output video stream in real time.

Further changes to the output video stream may further include applying an effect filter to the images of the output video stream. Some examples of the effect filter may include a contrast filter, luminosity filter, saturation filter, color filter, and an image deformation filter by way of example only. The effect filters may modify the visual display of the output video stream to create a more varied and immersive experience for the user and observer. Other forms of effects to the output video stream may include incorporating a soundtrack to the wide field video stream to further enhance the immersive experience.

Figure 5:
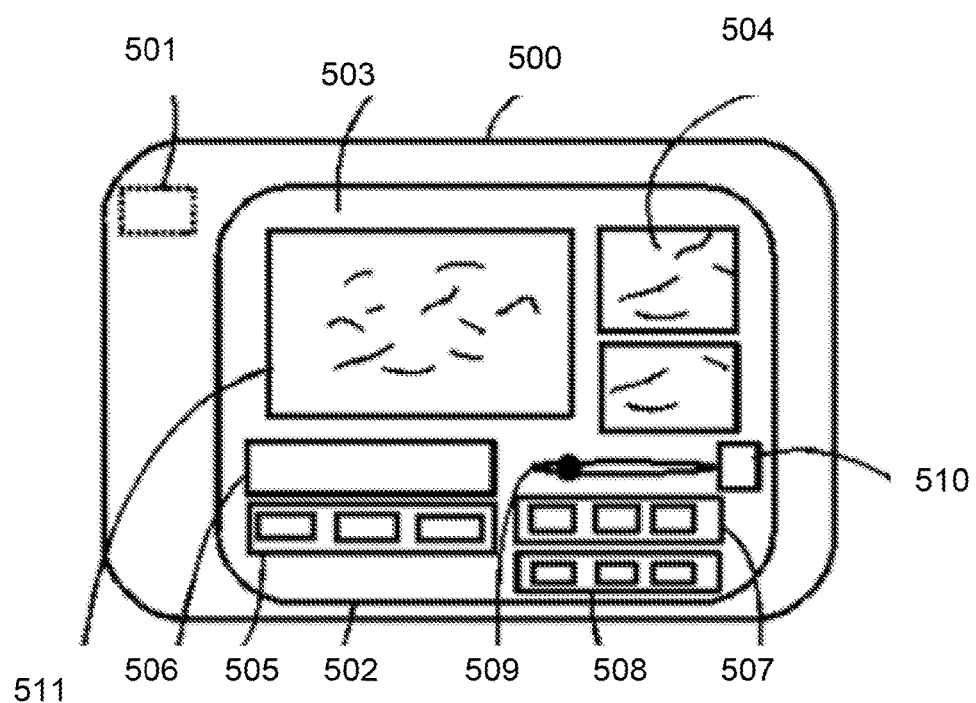
FIG. 5 illustrates an example device for managing an output video stream, in accordance with one or more implementations.

FIG. 5. illustrates a device for managing an output video stream. According to one implementation, the device may include a computer system 501 that includes a computer processor unit, graphic processor unit, and a memory containing instruction for implementing and generating a output video stream. The device 500 may include an interface 502 including at least one display screen 503 to display the output video stream. The display screen 503 may include a touchscreen so that the operator interact with the device 500 to select and choose a wide field video stream to generate an output video stream. The device 500 may further include a storage space for selecting a wide field video stream with an element for selecting a wide field video stream 505 from the computer system 501 of the device. The storage space can be incorporated within the device. In other aspects, by way of example only, the storage space may include a remote storage space, such as a remote server accessible via a communication network. The wide field video stream may be downloaded or broadcast in real time from the remote storage space.

The device 500 may include an various elements to create a virtual reality experience to the user or observer. The device may include a gyroscope to allow the user or observer equipped with an immersive headset coupled to the device 500 to view the output video stream in a computer simulated immersive multimedia form. Other elements may include an accelerometer or magnetometer to further enhance the virtual reality experience for the user or observer while viewing the output video stream.

Various elements to further generate an output video stream on the device 500 may include an element to select various portions of the wide field video stream 509, element for defining the desired field of view 506, an element for defining a desired projection 507, and an element for selecting an effect to be applied 508. Other embodiments may include various elements to incorporate extra effects to the output video stream, such as an element for controlling the soundtrack 510.

Figure 6:
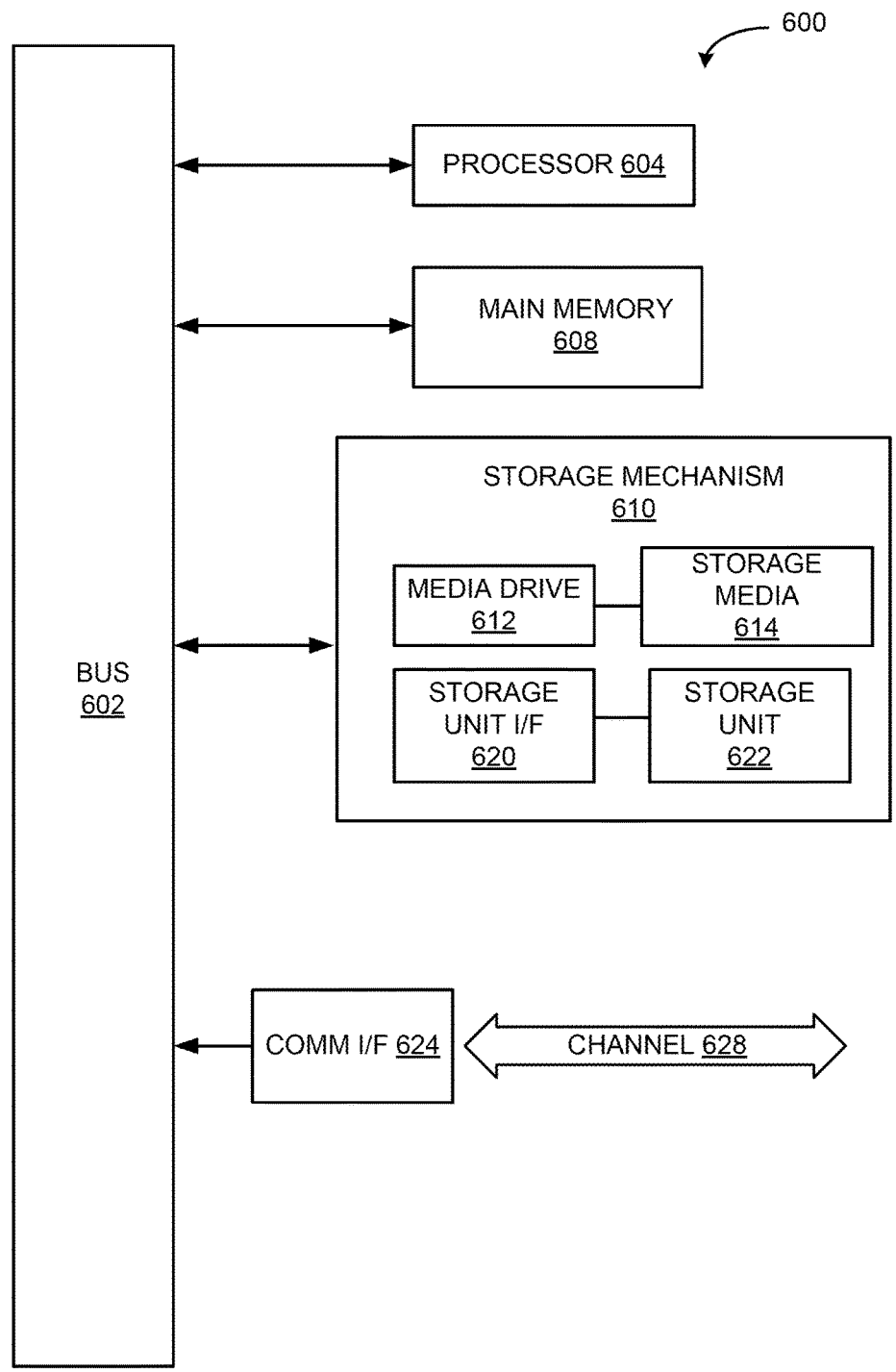
FIG. 6 illustrates an example computing module that may be used to implement various features of the technology as disclosed herein, in accordance with one or more implementations.

Referring now to FIG. 6, computing module 600 may represent, for example, computing or processing capabilities found within desktop, laptop, notebook, and tablet computers; hand-held computing devices (tablets, PDA's, smart phones, cell phones, palmtops, smart-watches, smart-glasses etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory, might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid state drive, a magnetic tape drive, an optical disk drive, a CD or DVD drive (R or RW), or other removable or fixed media drive might be provided. Accordingly, storage media 614 might include, for example, a hard disk, a solid state drive, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing module 600. Such instrumentalities might include, for example, a fixed or removable storage unit 622 and a storage interface 620. Examples of such storage units 622 and storage interfaces 620 can include a program cartridge and cartridge interface, a removable memory (for example, a flash memory or other removable memory module) and memory slot, a PCMCIA slot and card, and other fixed or removable storage units 622 and storage interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 608, storage unit 620, media 614, and channel 628. These and other various forms of computer program media or computer usable media may be involved in carrying one or more sequences of one or more instructions to a processing device for execution. Such instructions embodied on the medium are generally referred to as "computer program code" or a "computer program product" (which may be grouped in the form of computer programs or other groupings). When executed, such instructions might enable the computing module 600 to perform features or functions of the present application as discussed herein.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiment.

What is claimed is:

1. A method for generating an output video stream comprising:
    obtaining a wide field video stream;
    obtaining a specified first projection and a second projection of content from the wide field video stream to be displayed on a display space, the display space including a first screen and a second screen, the first screen and the second screen individually including multiple display points to display the content from the wide field video stream, the multiple display points including a first display point of the first screen and a second display point of the second screen;
    executing a first geometric function to generate intermediate points for the display points for the first screen and the second screen, wherein:
        for the first screen the first geometric function takes as parameters the first projection and a first field of view within the wide field video stream, wherein individual intermediate points for the first screen correspond to locations in the wide field video stream at which the content is to be presented on the first screen in the first projection such that the intermediate points for the first screen include a first intermediate point that corresponds to a first location in the wide field video stream at which the content to be presented at the first display point is located, and
        for the second screen the first geometric function takes as parameters the second projection and a second field of view within the wide field video stream, wherein individual intermediate points for the second screen correspond to locations in the wide field video stream at which the content is to be presented on the second screen in the second projection such that the intermediate points for the second screen include a second intermediate point that corresponds to a second location in the wide field video stream at which the content to be presented at the second display point is located;
    generating a first output video stream from the wide field video stream by determining reference points of the content of the wide field video stream for the intermediate points for the first screen, wherein individual reference points for the first screen are at least one pixel of the first output video stream determined from the content at the locations in the wide field video stream at which the content is to be presented on the first screen, such that a first reference point for the first intermediate point is at least one pixel of the first output video stream determined from the content at the first location in the wide field video stream;
    generating a second output video stream from the wide field video stream by determining reference points of the content of the wide field video stream for the intermediate points of the second screen, wherein individual reference points for the second screen are at least one pixel of the second output video stream determined from the content at the locations in the wide field video stream at which the content is to be presented on the second screen, such that a second reference point for the first intermediate point is at least one pixel of the second output video stream determined from the content at the second location in the wide field video stream; and
    effectuating a presentation of the first output video stream on the first screen concurrently with a presentation of the second output video stream on the second screen;
    wherein the display space comprises a virtual reality headset such that the first screen presents the first output video stream to a first eye of a user and the second screen presents the second output video stream to a second eye of the user creating an immersive experience.

2. The method of claim 1, wherein the intermediate points for the first screen correspond to at least one pixel of the content of the wide field video stream to be displayed on the first screen of the display space.

3. The method of claim 1, wherein determining the reference points of the content of the wide field video stream for the intermediate points for the first screen comprises executing a second geometric function such that the second geometric function takes as parameters the intermediate points for the first screen such that determining the first reference point includes executing the second geometric function that takes as a parameter the first intermediate point.

4. The method of claim 1, wherein the at least one pixel of the output video stream of the first reference point corresponds to at least one pixel of the content of the wide field video stream at the location in the wide field video stream that corresponds to the first intermediate point.

5. The method of claim 1, further comprising modifying the first field of view by updating a coordinate of the intermediate points for the first screen; and modifying the first field of view by updating an angle of the first field of view.

6. The method of claim 5, wherein modifying the first field of view further comprises modifying an orientation of a virtual video camera located in a spherical coordinate system.

7. The method of claim 5, wherein modifying the first field of view further comprises:
converting the coordinate on the intermediate point for the first screen in a three dimensional coordinate system into a spherical coordinate system; and
modifying an orientation of a virtual camera; and
normalizing the coordinate in the spherical coordinate system to generate a new coordinate on the intermediate point for the first screen in the three dimensional coordinate system.

8. The method of claim 7, wherein modifying the orientation of the virtual camera comprises a latitude angle of the virtual camera in the spherical coordinate system, a longitude angle of the virtual camera in the spherical coordinate system, and a field of angle value of the virtual camera.

9. The method of claim 1, further comprising executing the first geometric function with a graphical processor unit to generate a corresponding image of the first output video stream.

10. The method of claim 1, further comprising:
defining an effect filter to be applied to an image of the first output video stream.

11. The method of claim 10, wherein the effect filter comprises one or more of a contrast filter, a luminosity filter, a saturation filter, a color filter, or an image deformation filter.

12. A device configured to manage an output video stream comprising:
an element configured to:
select a wide field video stream;
obtain a specified first projection and a second projection of content from the wide field video stream to be displayed on a display space, the display space including a first screen and a second screen, the first screen and the second screen individually including multiple points to display the content from the wide field video stream, the multiple display points including a first display point of the first screen and a second display point of the second screen;
execute a first geometric function to generate intermediate points for the points on the display space for the first screen and the second screen, wherein:
for the first screen the first geometric function takes as parameters the first projection and a first field of view within the wide field video stream, wherein individual intermediate points for the first screen correspond to locations in the wide field video stream at which the content is to be presented on the first screen in the first projection such that the intermediate points for the first screen include a first intermediate point that corresponds to a first location in the wide field video stream at which the content to be presented at the first display point is located, and
for the second screen the first geometric function takes as parameters the second projection and a second field of view within the wide field video stream, wherein individual intermediate points for the second screen correspond to locations in the wide field video stream at which the content is to be presented on the second screen in the second projection such that the intermediate points for the second screen include a second intermediate point that corresponds to a second location in the wide field video stream at which the content to be presented at the second display point is located;
generate a first output video stream from the wide field video stream by executing a second geometric function that takes as parameters the intermediate points for the first screen, the execution of the second geometric function determines reference points of the content of the wide field video stream for the intermediate points for the first screen, wherein individual reference points for the first screen are at least one pixel of the first output video stream determined from the content at the locations in the wide field video stream at which the content is to be presented on the first screen, such that a first reference point for the first intermediate point is at least one pixel of the first output video stream determined from the content at the first location in the wide field video stream;
generate a second output video stream from the wide field video stream by executing the second geometric function that takes as parameters the intermediate points for the second screen, the execution of the second geometric function determines reference points of the content of the wide field video stream for the intermediate points for the second screen, wherein individual reference points for the second screen are at least one pixel of the second output video stream determined from the content at the locations in the wide field video stream at which the content is to be presented on the second screen, such that a second reference point for the second intermediate point is at least one pixel of the second output video stream determined from the content at the second location in the wide field video stream; and
effectuate a presentation of the first output video stream on the first screen concurrently with a presentation of the second output video stream on the second screen;
wherein display space comprises a virtual reality headset such that the first screen presents the first output video stream to a first eye of a user and the second screen presents the second output video stream to a second eye of the user creating an immersive experience.

13. The device of claim 12, further comprising a touchscreen, an accelerometer, a gyroscope, a magnetometer, a space for displaying the wide field video stream, a pointing device, and a moving detecting gestural interface.

14. The device of claim 13, further comprising the display space.

15. A system configured to generate an output video stream from a wide field video stream, the system comprising:
one or more physical processors configured by machine-readable instructions to:
select a wide field video stream corresponding to an assembly of multiple video streams, the wide field video stream including different fields of view of a same environment;
obtain a specific first projection and a second projection of the wide field video stream to be displayed on a display space, the display space including a first screen and a second screen, the first screen and the second screen individually including multiple points to display the content from the wide field video stream, the multiple display points including a first display point of the first screen and a second display point of the second screen;

execute a first geometric function to generate intermediate points for the display points for the first screen and the second, wherein:

for the first screen the first geometric function takes as parameters the first projection and a first field of view in the wide field video stream, wherein the intermediate points for the first screen correspond to locations in the wide field video stream at which the content is to be presented on the first screen in the first projection such that the intermediate points for the first screen include a first intermediate point that corresponds to a first location in the wide field video stream at which the content to be presented at the first display point is located, and for the second screen the first geometric function takes as parameters the second projection and a second field of view within the wide field video stream, wherein individual intermediate points for the second screen correspond to locations in the wide field video stream at which the content is to be presented on the second screen in the second projection such that the intermediate points for the second screen include a second intermediate point that corresponds to a second location in the wide field video stream at which the content to be presented at the second display point is located:

generate a first output video stream from the wide field video stream by determining reference points of the content of the wide field video stream for the intermediate points for the first screen, wherein individual reference points for the first screen are at least one pixel of the first output video stream determined from the content at the locations in the wide field video stream at which the content is to be presented on the first screen, such that a first reference point for the first intermediate point is at least one pixel of the first output video stream determined from the content at the first location in the wide field video stream;

generate a second output video stream from the wide field video stream by determining reference points of the content of the wide field video stream for the intermediate points of the second screen, wherein individual reference points for the second screen are at least one pixel of the second output video stream determined from the content at the locations in the wide field video stream at which the content is to be presented on the second screen, such that a second reference point for the first intermediate point is at least one pixel of the second output video stream determined from the content at the second location in the wide field video stream; and effectuate a presentation of the first output video stream on the first screen concurrently with a presentation of the second output video stream on the second screen;

wherein the display space comprises a virtual reality headset such that the first screen presents the first output video stream to a first eye of a user and the second screen presents the second output video stream to a second eye of the user creating an immersive experience.

\* \* \* \* \*